US008281983B2

(12) United States Patent
Shuman et al.

(10) Patent No.: US 8,281,983 B2
(45) Date of Patent: Oct. 9, 2012

(54) METHOD AND APPARATUS FOR STORING AND VERIFYING SERIAL NUMBERS USING SMART LABELS IN AN IMAGE PRODUCTION DEVICE

(75) Inventors: David Scott Shuman, Webster, NY (US); Jun Sano, Webster, NY (US); Heiko Rommelmann, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/824,881

(22) Filed: Jun. 28, 2010

(65) Prior Publication Data

US 2011/0315758 A1 Dec. 29, 2011

(51) Int. Cl.

| | |
|---|---|
| ***G06F 17/00*** | (2006.01) |
| ***G06K 7/00*** | (2006.01) |
| ***G06K 19/00*** | (2006.01) |
| ***G06K 7/08*** | (2006.01) |
| ***G06K 19/06*** | (2006.01) |
| ***G08B 13/14*** | (2006.01) |

(52) U.S. Cl. ........ 235/375; 235/487; 235/435; 235/449; 235/451; 235/492; 235/493; 340/572.1

(58) Field of Classification Search .................. 235/375, 235/435, 449, 451, 487, 492, 493; 340/572.1; 358/1.12, 1.18

See application file for complete search history.

(56) References Cited

U.S. PATENT DOCUMENTS 6,177,860 B1 * 1/2001 Cromer et al. ............... 340/10.1
6,362,893 B1 * 3/2002 Francis et al. ............... 358/1.14
6,406,120 B2 * 6/2002 Pauschinger .................... 347/19
6,593,952 B1 * 7/2003 Funayama et al. ............ 347/193
6,597,465 B1 * 7/2003 Jarchow et al. .............. 358/1.12
6,650,430 B2 * 11/2003 Francis et al. ............... 358/1.14
6,738,903 B1 * 5/2004 Haines .......................... 713/168
6,778,096 B1 * 8/2004 Ward et al. ........................ 713/1
6,940,613 B1 9/2005 Beard et al.
7,137,000 B2 * 11/2006 Hohberger et al. ........... 713/168
7,194,438 B2 * 3/2007 Sovio et al. ...................... 705/50
7,212,637 B2 * 5/2007 Salisbury ...................... 380/270
7,356,279 B2 * 4/2008 Miller ........................... 399/109
7,664,257 B2 * 2/2010 Hohberger et al. ............. 380/22
7,782,477 B2 * 8/2010 Kimura et al. ............... 358/1.16
7,941,061 B2 * 5/2011 Kadowaki ....................... 399/12

(Continued)

FOREIGN PATENT DOCUMENTS

JP 2008059137 A * 3/2008

*Primary Examiner* — Daniel Walsh

(74) *Attorney, Agent, or Firm* — Ronald E. Prass, Jr.; Prass LLP

(57) ABSTRACT

A method and apparatus for storing and verifying serial numbers using a smart label in an image production device is disclosed. The method for storing may include receiving a signal to query a smart label for serial number information, querying the smart label for serial number information, receiving the serial number information from the smart label, and storing the serial number information in a memory. The method for verifying may include receiving a signal to query a smart label for serial number information, querying the smart label for serial number information, receiving the serial number information from the smart label, determining if the serial number matches a serial number stored in the image production device, wherein if it is determined that the serial number matches the stored serial number performing requested image production device operations, otherwise sending an error signal.

16 Claims, 5 Drawing Sheets

U.S. PATENT DOCUMENTS

| | | | | |
|---|---|---|---|---|
| 8,174,719 | B2 * | 5/2012 | Gurr et al. | 358/1.15 |
| 2001/0020961 | A1 * | 9/2001 | Pauschinger | 347/19 |
| 2001/0052993 | A1 * | 12/2001 | Lumley | 358/1.12 |
| 2001/0053301 | A1 * | 12/2001 | Nishii | 400/63 |
| 2002/0046312 | A1 * | 4/2002 | Nakamura | 710/301 |
| 2002/0051167 | A1 * | 5/2002 | Francis et al. | 358/1.14 |
| 2002/0135630 | A1 * | 9/2002 | Kosugi | 347/19 |
| 2003/0059050 | A1 * | 3/2003 | Hohberger et al. | 380/270 |
| 2004/0136768 | A1 * | 7/2004 | Klinefelter et al. | 400/663 |
| 2004/0160322 | A1 * | 8/2004 | Stilp | 340/572.1 |
| 2004/0181681 | A1 * | 9/2004 | Salisbury | 713/200 |
| 2004/0212651 | A1 * | 10/2004 | Johnson et al. | 347/19 |
| 2005/0021310 | A1 * | 1/2005 | Zeng et al. | 702/188 |
| 2005/0116034 | A1 * | 6/2005 | Satake et al. | 235/432 |
| 2005/0125093 | A1 * | 6/2005 | Kikuchi et al. | 700/213 |
| 2005/0206672 | A1 * | 9/2005 | Adkins et al. | 347/19 |
| 2005/0247775 | A1 * | 11/2005 | Gloekler et al. | 235/375 |
| 2006/0191022 | A1 * | 8/2006 | Hohberger et al. | 726/30 |
| 2006/0203839 | A1 * | 9/2006 | Yoshida | 370/452 |
| 2007/0097161 | A1 * | 5/2007 | Ejiri et al. | 347/5 |
| 2007/0150543 | A1 * | 6/2007 | Fong et al. | 709/206 |
| 2007/0198649 | A1 * | 8/2007 | Kamata et al. | 709/207 |
| 2007/0216941 | A1 * | 9/2007 | Jingu | 358/1.15 |
| 2008/0055640 | A1 * | 3/2008 | Takahashi et al. | 358/1.15 |
| 2008/0158319 | A1 * | 7/2008 | Silverbrook | 347/87 |
| 2008/0291250 | A1 * | 11/2008 | Silverbrook | 347/85 |
| 2008/0317479 | A1 * | 12/2008 | Kadowaki | 399/12 |
| 2009/0006747 | A1 * | 1/2009 | Otsuka | 711/115 |
| 2009/0025072 | A1 * | 1/2009 | Kondo | 726/7 |
| 2009/0039147 | A1 * | 2/2009 | Yamamoto et al. | 235/375 |
| 2009/0174893 | A1 * | 7/2009 | Fujii et al. | 358/1.15 |
| 2009/0262382 | A1 * | 10/2009 | Nobutani | 358/1.15 |
| 2010/0001838 | A1 * | 1/2010 | Miodownik et al. | 340/10.1 |
| 2010/0007496 | A1 * | 1/2010 | Orlassino | 340/572.1 |
| 2010/0052863 | A1 * | 3/2010 | Renfro et al. | 340/10.4 |
| 2010/0284531 | A1 * | 11/2010 | Hohberger et al. | 380/22 |
| 2011/0075189 | A1 * | 3/2011 | Refstrup | 358/1.14 |
| 2011/0109938 | A1 * | 5/2011 | Refstrup | 358/1.15 |
| 2011/0140896 | A1 * | 6/2011 | Menzel | 340/573.1 |
| 2011/0191454 | A1 * | 8/2011 | Joukov | 709/223 |
| 2011/0231526 | A1 * | 9/2011 | Hsieh | 709/220 |

* cited by examiner

METHOD AND APPARATUS FOR STORING AND VERIFYING SERIAL NUMBERS USING SMART LABELS IN AN IMAGE PRODUCTION DEVICE

BACKGROUND

Disclosed herein is a method for storing and verifying serial numbers using a smart label in an image production device, as well as corresponding apparatus and computer-readable medium.

It has become increasingly important to safeguard the system serial number placed within electronic devices at time of manufacture. In particular, there are some requirements somewhat unique to multi-function image production devices. The serial number is transmitted through a communications network to assist in device recognition, supplies replenishment, warranty claims, machine unique passcodes, etc., for example. Furthermore, color laser devices are required to provide tracking information on all printed output that indicates the serial number of the image production device.

Generally, the serial number is input at time of manufacture to some non-volatile memory location. However, a problem occurs whenever the electronics that store this number fail or are replaced. Currently, many image production devices employ a system of multiple data points (usually 3), so that if one component is replaced, it will be automatically updated to match the two other points (assuming they match). In cases where there is a three way mismatch, or in manufacturing, a secure tool is provided to recover the data points. In more extreme cases, field engineering must produce a set of electronics which are already serialized, to be placed into the image production device. Both of these solutions are expensive and generally result in machine down time. Also, with increasing emphasis on circuit board consolidation, it will become more difficult to maintain multiple reference points.

SUMMARY

A method and apparatus for storing and verifying serial numbers using a smart label in an image production device is disclosed. The method for storing may include receiving a signal to query a smart label for serial number information, querying the smart label for serial number information, receiving the serial number information from the smart label, and storing the serial number information in a memory. The method for verifying may include receiving a signal to query a smart label for serial number information, querying the smart label for serial number information, receiving the serial number information from the smart label, determining if the serial number matches a serial number stored in the image production device, wherein if it is determined that the serial number matches the stored serial number performing requested image production device operations, otherwise sending an error signal.

DETAILED DESCRIPTION

Figure 1:
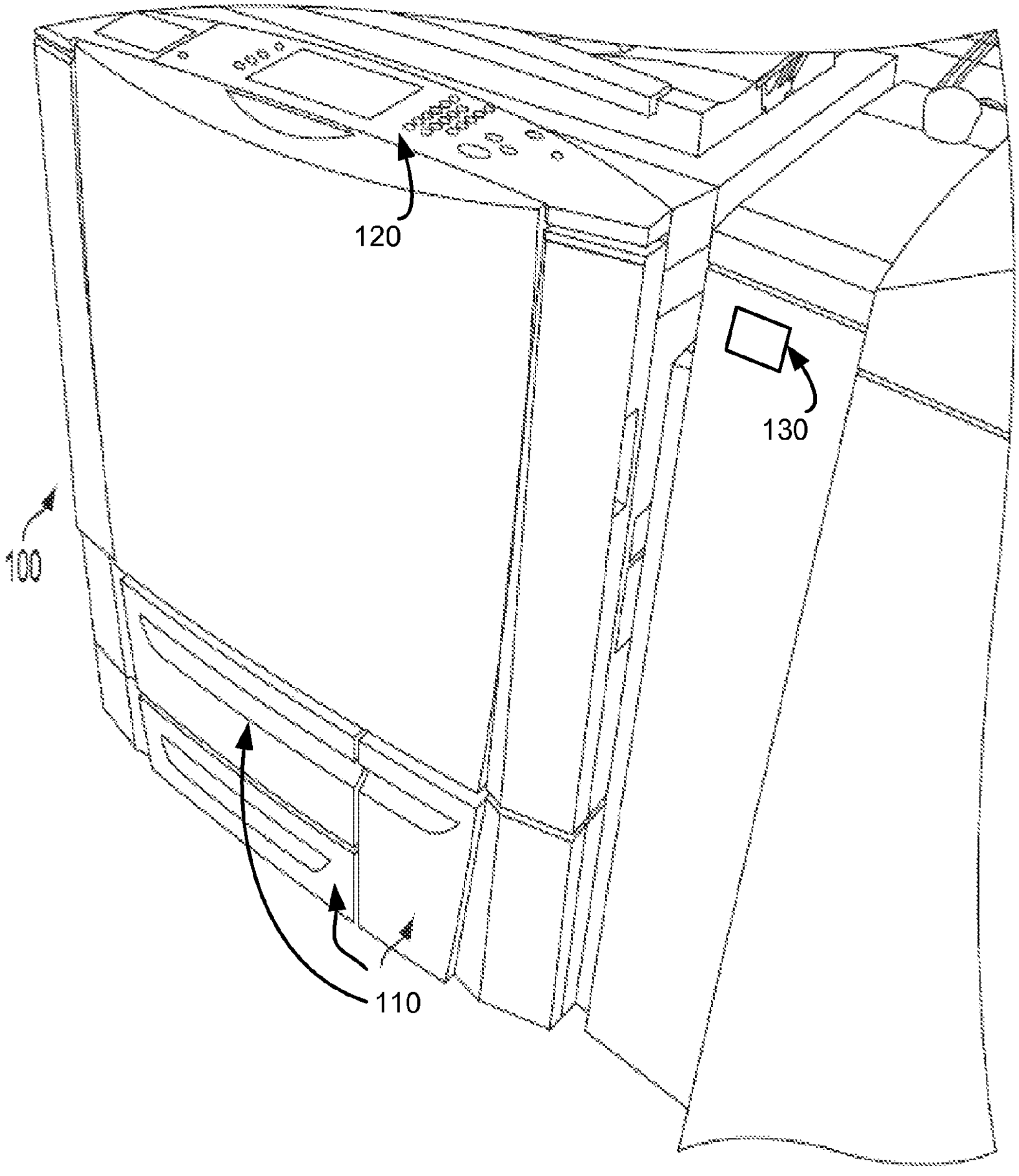
FIG. 1 is an exemplary diagram of an image production device in accordance with one possible embodiment of the disclosure.

Aspects of the embodiments disclosed herein relate to a method for storing and verifying serial numbers using a smart label in an image production device, as well as corresponding apparatus and computer-readable medium.

The disclosed embodiments may include a method for storing serial numbers using a smart label in an image production device. The method may include receiving a signal to query a smart label for serial number information, the serial number information identifying at least one of the image production device and any components of the image production device, and the smart label being a label located at one of on the image production device and inside of the image production device that communicates with the image production device, querying the smart label for serial number information, receiving the serial number information from the smart label, and storing the serial number information in a memory.

The disclosed embodiments may further include an image production device that may include a memory that stores serial number information, the serial number information identifying at least one of the image production device and any components of the image production device, and the smart label being a label located at one of on the image production device and inside of the image production device that communicates with the image production device, a smart label detection device that receives a signal to query a smart label for serial number information, queries the smart label for serial number information, and receives the serial number information from the smart label, and a smart label management unit that stores the serial number information in a memory.

The disclosed embodiments may include a method for verifying serial numbers using a smart label in an image production device. The method may include receiving a signal to query a smart label for serial number information, the serial number information identifying at least one of the image production device and any components of the image production device, and the smart label being a label located at one of on the image production device and inside of the image production device that communicates with the image production device, querying the smart label for serial number information, receiving the serial number information from the smart label, determining if the serial number matches a serial number stored in the image production device, wherein if it is determined that the serial number matches the stored serial number performing requested image production device operations, otherwise sending an error signal.

The disclosed embodiments may further include an image production device that may include a memory that stores serial number information, the serial number information identifying at least one of the image production device and any components of the image production device, and the smart label being a label located at one of on the image production device and inside of the image production device that communicates with the image production device, a smart label detection device that receives a signal to query a smart label for serial number information, queries the smart label for serial number information, and receives the serial number information from the smart label, and a smart label management unit that determines if the serial number matches a serial number stored in the memory, wherein if the smart label management unit determines that the serial number matches the stored serial number, the smart label management unit performs requested image production device operations, otherwise the smart label management unit sends an error signal.

The disclosed embodiments propose to use smart labels for assuring the integrity of electronic serial numbers. In conventional serial number protection techniques used on conventional image production devices, the serial number is stored in three discrete locations of non-volatile memory. If any particular component which stores one of these data points is replaced, then at power-up the device will see a two-of-three match and will write that number to the new component. For that reason, service techs are instructed to only replace one at a time. However, on occasion, unexpected failures occur and none of the three reference points correspond. On some devices, the strategy is to have engineering create a set of three boards with the appropriate serial number in a lab, and ship the set to the field for a service tech to install. This solution is extremely expensive to the OEM, generally costing them at least $1500 per occurrence. On other products, a password routine is provided where field engineering uses a tool to generate a device-unique passcode (16 characters), which is provided to a service tech who inputs it to the device. While this routine is generally suitable, there are logistics challenges associated with performing this in real time, due to time zone differences, tech and engineering personnel availability, tool security, etc.

More critically, in interest of cutting costs, there is an increased emphasis on circuit board consolidation, so with this there are fewer ways of isolating the three discrete memory locations. This consolidation requires a greater degree of non-volatility that is most firmly connected with the device itself rather than any of the replaceable components.

However, the smart labels of the disclosed embodiments may serve as serial number plates with the additional feature that the image production device can read the label and capture the serial number into the system. The labels may not be removed from the frame without tearing and being rendered useless. Further, the system may have a lock in encryption to ensure they are not being replaced by unauthorized personnel, or that another label is not being read in the general proximity. Only authorized manufacturing or remanufacturing sites may have the tools to generate or regenerate these labels. If the label mismatches or cannot be read, the image production device may not function. In this manner, preventative measures for fraud and illegal printing activities cannot be circumvented.

The smart labels may also allow for secure serialization of electronic equipment in which it is possible that components storing the serial number may fail or need to be replaced. The smart label may be of radio frequency (RF) or another variety of communication between smart label and the image production device.

As such, electronic devices, such as multifunction image production devices, may have an RF antenna (or ribbon port) attached to the controller circuitry. At every power-on, and/or at some interval, the image production device may query the label for the serial number and may set the device's internally stored serial number accordingly. Security may be built into the handshake routine to ensure the device is not reading some other label that has been plugged in or placed in proximity of the antenna, for example. Any failure to read the label and validate its authenticity may result in the image production device raising a fault and being rendered inoperative until an authorized service action is performed. For that reason, there may be emphasis on the label having a high degree of reliability.

At the time of manufacture, the label may be created by commonly available devices that both print the label in ink and embed the same number electronically. This number may remain assigned to this label for the life of the image production device. If the label is physically removed from the frame, it may become inoperative and the image production device may be disabled.

It may become necessary to change the serial number at some point in the life of an image production device, particularly in a remanufacturing environment. In that case, the image production device may be assigned new labels. Obviously, the label-making equipment may have adequate authorization protection assigned by original equipment manufacturer (OEM).

Such protection may, for example, be achieved through use of an authentication functionality built into the smart label, the label-making equipment and the image production device itself, if deemed necessary. An example of such an authentication function may be an encryption algorithm based on random number generator, variable data and fixed data inputs, as are commonly used for bank cards.

One aspect of the disclosed embodiments is that the smart label and the image production device may have some a "mating" that occurs. In particular, the state of the image production device and its smart label may fall into one of 5 basic categories:

1) Image production device unserialized, smart label virgin—manufacturing/remanufacture. Image production device serializes itself to the smart label. Smart label may set a flag or other indicator, for example, that it has been mated with the image production device.

2) Image production device serialized, smart label virgin—overwrite the image production device serial number with that from the label.

3) Image production device serialized, smart label mated and they match—OK.

4) Image production device serialized, smart label mated but they don't match. Throw error, image production device inoperable. Call Xerox.

5) Image production device unserialized, smart label mated but they (obviously) don't match. This is where the system NVM module has failed and/or been changed out and is the biggest challenge.

States 4 or 5 could happen in the field through legitimate service action. Potential solutions may include the following:

During state 4, when image production device first mates to the smart label, the image production device's Media Access Control (MAC) address may also be written to the smart label. The MAC addresses may always be compared to validate the match. However, in some cases service must replace the board itself (which contains the MAC). In that instance, service may be instructed to never replace the non-volatile memory (NVM) module at the same time. (The technicians in the field may already know they should never replace two boards at a time, else a serial mismatch will result). The image production device may allow a MAC mismatch if there is no smart mismatch (and write the new MAC to the serial label). In the rare occurrences in which both the NVM module and the image production device board have failed, the image production device may require another form of backup recovery or the board and NVM may be traded out.

The use of MAC addresses may be preferred because MAC addresses cannot be easily altered on an image production device short of replacing the board. Therefore with respect to using MAC addresses and states 4 and 5, the following may apply:

4a. Image production device serialized, serial mismatch, MACs match—write the serial from the smart label to the image production device.

4b. Image production device serialized, serial mismatch, MACs don't match—image production device inoperable 5a. Image production device unserialized, serial mismatch, MACs match—write the serial from the smart label to the image production device.

5b. Image production device unserialized, serial mismatch, MACs don't match—image production device inoperable.

It would take a great deal of effort to cheat this system. In conventional image production devices, it is easier to cheat a system by replacing two of the three boards from one image production device to another.

While the primary purpose of the disclosed embodiments may be for the internal consumption of the serial number, the process also may offer additional benefits to the supply and warehousing chain—for which the advantages to RF identification (RFID) are well documented. However, while smart labels are typically used to identify information externally to the product (read via scanners), in the disclosed embodiments the data may be consumed by the image production device itself. Any broadcasts of this data to the outside world may be processed and controlled by the image production device before reaching the communications network.

Some of the primary reasons why multi-function image production devices need to guarantee serial number integrity include that the device serial number may be stored internally in non-volatile memory. Unlike some smaller electronics devices (such as cell phones which are simply scrapped out), the more expensive devices occasionally need to have hardware replaced, including that which contains the stored serial number, for example. Having this serial number be alterable through such procedures may open up opportunities for intentional fraudulent misuse. However, even in the benign case of unintentional alteration, there may be numerous fallouts. The following is a partial list of possible functions reliant upon the system serial number:

- May serve as a unique image production device identifier over the network for automated information forwarding, automated supplies replenishment, device discovery, etc.
- May serve as a unique image production device identifier to be used in device-unique passcodes used for setting various configuration parameters (speed setting, service plan designation, etc.).
- May serve as confirmation for warranty administration.
- May be embedded in dot pattern on all marked images, to allow federal investigators to determine the source of illegal reproductions. For that reason, it is a Government mandate that color xerographic equipment maintains serial integrity. Knowing the serial number of the offending equipment may lead investigators to the customer who purchased the image production device, but ultimately the serial plate will confirm the exact device within the customer environment. For that reason, it is imperative to guarantee a match of the internal serial number to that on the serial plate.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include one or more media tray doors 110 and a local user interface 120. The one or more media tray doors 110 may provide access to one or more media trays that contain media. The one or more media tray doors 110 may be opened by a user so that media may be checked, replaced, or to investigate a media misfeed or jam, for example.

The user interface 120 may contain one or more display screen (which may be a touchscreen or simply a display), and a number of buttons, knobs, switches, etc. to be used by a user to control image production device 100 operations. The one or more display screen may also display warnings, alerts, instructions, and information to a user. While the user interface 120 may accept user inputs, another source of image data and instructions may include inputs from any number of computers to which the printer is connected via a network. The image production device 100 may also include a smart label 130 that may be attached anywhere on the image production device 100. The smart label will be described in detail below in relation to FIG. 3.

Figure 2:
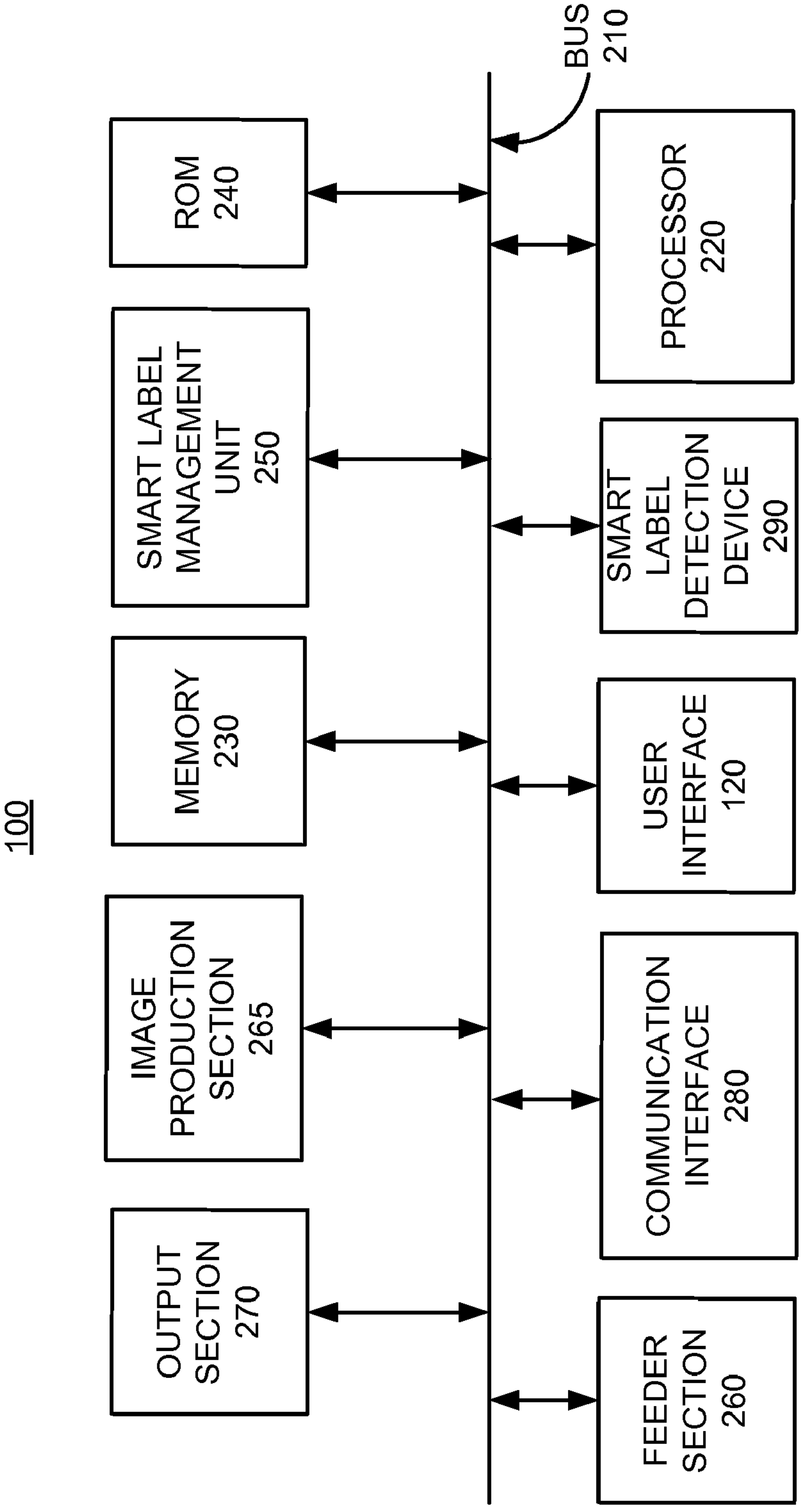
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, a smart label management unit 250, a feeder section 260, an output section 270, a user interface 120, a communication interface 280, an image production section 265, and a smart label detection device 290. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

The image production section 265 may include hardware to produce image on media and may include an image printing and/or copying section, a scanner, a fuser, etc., for example. The stand-alone feeder section 260 may store and dispense media sheets on which images are to be printed. The output section 270 may include hardware for stacking, folding, stapling, binding, etc., prints which are output from the image production section. If the image production device 100 is also operable as a copier, the image production device 100 may further includes a document feeder and scanner which may operate to convert signals from light reflected from original hard-copy image into digital signals, which are in turn processed to create copies with the image production section 265.

With reference to feeder section 260, the section may include one or more media trays, each of which stores a media stack or print sheets ("media") of a predetermined type (size, weight, color, coating, transparency, etc.) and may include a feeder to dispense one of the media sheets therein as instructed. The media trays may be accessed by a user by opening the one or more media tray doors 110. The one or more media tray door sensors may sense if one or more media tray door 110 is either open or closed. The one or more media tray door sensors may be any sensors known to one of skill in the art, such as contact, infra-red, magnetic, or light-emitting diode (LED) sensors, for example. The one or more media tray size sensors may be any sensors that may detect media size in a media known to one of skill in the art, including switches, etc.

User interface 120 may include one or more conventional mechanisms that permit a user to input information to and interact with the image production unit 100, such as a keyboard, a display, a mouse, a pen, a voice recognition device, touchpad, buttons, etc., for example. Output section 270 may include one or more conventional mechanisms that output image production documents to the user, including output trays, output paths, finishing section, etc., for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

The operation of the smart label management unit 250 and the smart label detection device 290 will be discussed below in relation to the flowcharts in FIGS. 4 and 5.

Figure 3:
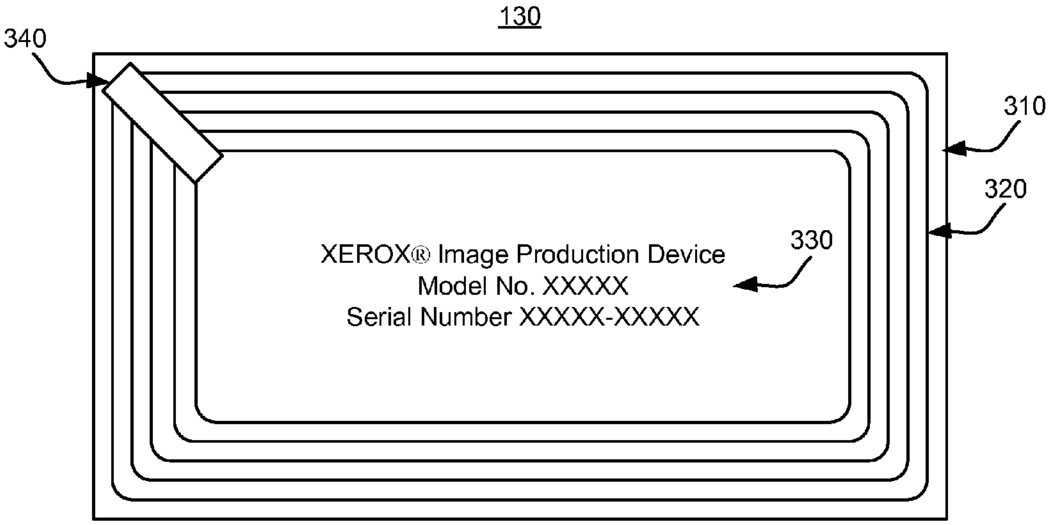
FIG. 3 is an exemplary diagram of a smart label in accordance with one possible embodiment of the disclosure.

FIG. 3 is an exemplary diagram of a smart label 130 in accordance with one possible embodiment of the disclosure. The smart label 130 may include edges 310, antenna windings 320, identification text 330, and a controller/memory unit 340. The smart label 130 may be active or passive, for example. The smart label 130 may be a label located on the image production device 100 as shown in FIG. 1, or inside of the image production device 100, such as behind one of the media tray 110 or other access doors. The smart label 130 may be an RF device, an RFID device, or any other communication device capable of communicating the serial number to the image production device 100. The smart label 130 may be made of any known material suitable to perform its function, such as plastic, composite, cloth fiber, metal, etc. The smart label may be secured so that it is difficult to remove.

While the antenna windings 320 may be shown, any antenna system known to one of skill in the art may be used in the smart label 130. The identification text 330 may be text that lists the serial number and other relevant information so it may be read by the user or technician, for example. The controller/memory unit 340 may include any processing device that will receive a query from the image production device 100 and/or be programmed to transmit (on demand or periodically) the serial number information to the image production device 100. The controller/memory unit 340 may also include a memory device capable of storing the serial number information (or the image production device's 100 MAC address information). Note that within the scope of the disclosed embodiments, that the image production device 100 may store a serial number that is written to the smart label's 130 memory or the serial number from the smart label 130 is written to the image production device 100.

Figure 4:
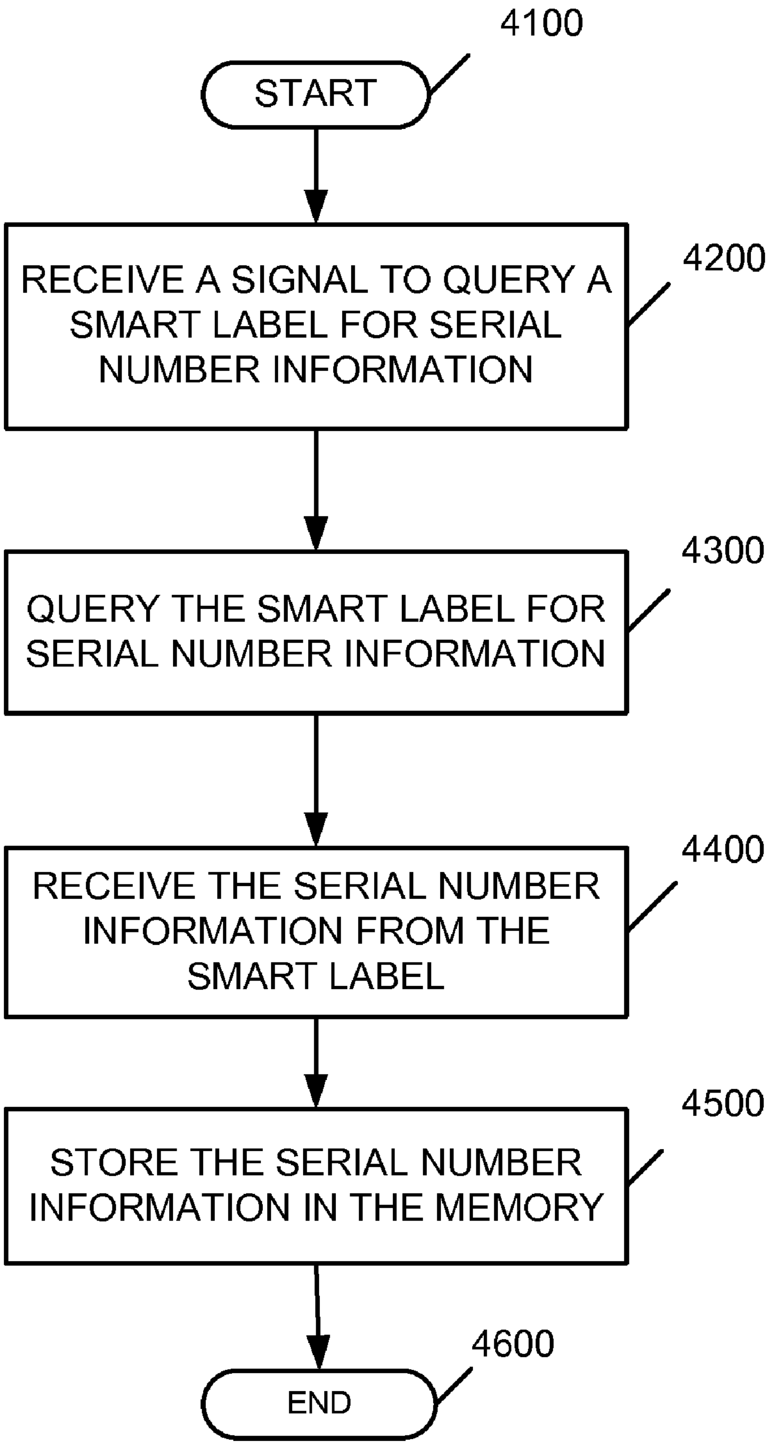
FIG. 4 is a flowchart of an exemplary serial number storing process using a smart label in accordance with one possible embodiment of the disclosure.

FIG. 4 is a flowchart of an exemplary serial number storing process using smart label in accordance with one possible embodiment of the disclosure. The process may begin at step 4100 and may continue to step 4200 where the smart label detection device 290 may receive a signal to query a smart label 130 for serial number information. The signal may be received from a user at a remote location, a user at the image production device 100 user interface 120, or automatically, for example. The serial number information may identify the image production device 100 and/or any components of the image production device 100, such as parts, consumables, warranty items, etc. At step 4300, the smart label detection device 290 may query the smart label 130 for serial number information. At step 4400, the smart label detection device 290 may receive the serial number information from the smart label 130.

At step 4500, a smart label management unit 250 may store the serial number information in a memory 230. The process may then go to step 5800 and end.

Note that the steps of receiving a signal querying the smart label, querying the smart label for serial number information, receiving the serial number, and storing the serial number information, may be preformed at the original equipment manufacturer's facility, at an intermediate site between the original equipment manufacturer, or at a user's location, for example. In addition, the image production device's Media Access Control (MAC) address may be stored in the smart label's memory so it may also be verified.

Figure 5:
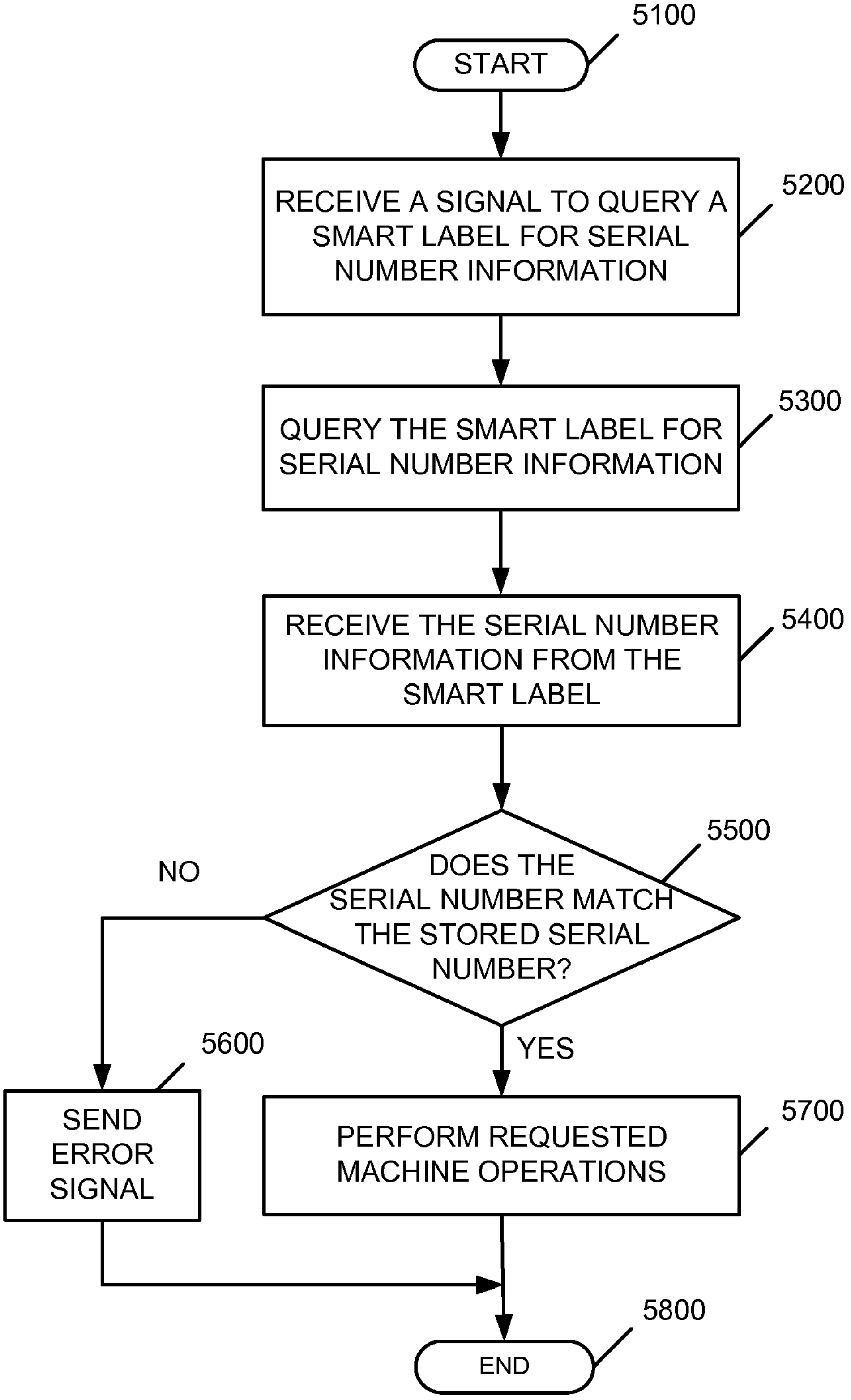
FIG. 5 is a flowchart of an exemplary serial number verification process using a smart label in accordance with one possible embodiment of the disclosure.

FIG. 5 is a flowchart of an exemplary serial number verification process using smart label in accordance with one possible embodiment of the disclosure. The process may begin at step 5100, and continues to step 5200 where the smart label detection device 290 may receive a signal to query a smart label 130 for serial number information. In this manner, the smart label detection unit 290 may receive the signal from a user at the image production device 100 user interface 120, automatically at a predetermined interval, or at start-up of the image production device 100, for example. The serial number information may identify the image production device 100, and/or any components of the image production device 100, such as parts, consumables, warranty items, etc.

At step 5300, the smart label detection device 290 may query the smart label 130 for serial number information. At step 5400, the smart label detection device 290 may receive the serial number information from the smart label 130.

At step 5500, the smart label management unit 250 may determine if the serial number matches a serial number stored in the memory 230. If the smart label management unit 250 determines that the serial number matches the stored serial number, at step 5700, the smart label management unit 250 may perform image production device 100 operations. The process may then go to step 5800 and end.

Otherwise, if at step 5500 the smart label management unit 250 determines that the serial number matches the stored serial number, the process goes to step 5600 where the smart label management unit 250 may send an error signal. In this manner, the smart label management unit 250 may send the error signal to the user at the image production device 100, to a remote facility, such as the OEM, a repair facility, administrator, or other location known to those of skill in the art, for example. The image production device 100 may be inoperable until the serial number conflict is resolved. The process may then go to step 5800 and end.

Note that the image production device's MAC address may be stored in the smart label 130 and may also be verified along with (or instead of) the serial number. For example, the image production device's 100 Media Access Control (MAC) address may be stored in the smart label's memory. The smart label detection device 290 may receive a signal to query a smart label 130 for the image production device's 100 MAC address, may query the smart label 130 for the image production device's 100 MAC address, and may receive the image production device's 100 MAC address from the smart label 130. The smart label management unit 250 may determine if the image production device's 100 MAC address matches the image production device's 100 MAC address stored in the image production device. If the smart label management unit 250 determines that the image production device's MAC address matches the stored the image production device's 100 MAC address, the image production device 100 may perform requested operations. Otherwise the smart label management unit 250 may send an error signal to the OEM, remote repair facility, image production device administrator, or other responsible party.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for storing serial numbers using a smart label in an image production device, comprising:

receiving a signal to query a smart label for serial number information, the serial number information identifying at least one of the image production device and any components of the image production device, and the smart label being a label located at one of on the image production device and inside of the image production device that communicates with the image production device;

querying the smart label for serial number information;

receiving the serial number information from the smart label; and storing the received serial number information in a memory in the image production device, wherein the image production device's Media Access Control (MAC) address is stored in the smart label's memory, receiving a signal to query the smart label for the image production device's MAC address;

querying the smart label for the image production device's MAC address;

receiving the image production device's MAC address from the smart label; and storing the image production device's MAC address in the image production device's memory.

2. The method of claim 1, wherein the signal is received from one of a user at a remote location, a user at the image production device user interface, and automatically.

3. The method of claim 1, wherein receiving a signal querying the smart label, querying the smart label for serial number information, receiving the serial number, and storing the serial number information, are preformed at one of the original equipment manufacturer's facility, at an intermediate site between the original equipment manufacturer, and at a user's location.

4. The method of claim 1, wherein the image production device is one of a copier, a printer, a facsimile device, and a multi-function device.

5. An image production device, comprising:

a memory that stores serial number information, the serial number information identifying at least one of the image production device and any components of the image production device;

a smart label detection device that receives a signal to query a smart label for serial number information, queries the smart label for serial number information, and receives the serial number information from the smart label, and a smart label management unit that stores the serial number information in a memory, wherein the smart label is a label located at one of on the image production device and inside of the image production device that communicates with the image production device, and the image production device's Media Access Control (MAC) address is stored in the smart label's memory, wherein the smart label detection device receives a signal to query the smart label for the image production device's MAC address, queries the smart label for the image production device's MAC address, and receives the image production device's MAC address from the smart label, the smart label management unit storing the image production device's MAC address in the image production device's memory.

6. The image production device of claim 5, wherein the signal is received from one of a user at a remote location, a user at the image production device user interface, and automatically.

7. The image production device of claim 5, wherein receiving a signal querying the smart label, querying the smart label for serial number information, receiving the serial number, and storing the serial number information, are preformed at one of the original equipment manufacturer's facility, at an intermediate site between the original equipment manufacturer, and at a user's location.

8. The image production device of claim 5, wherein the image production device is one of a copier, a printer, a facsimile device, and a multi-function device.

9. A method for verifying serial numbers using a smart label in an image production device, comprising:

receiving a signal to query a smart label for serial number information, the serial number information identifying at least one of the image production device and any components of the image production device, and the smart label being a label located at one of on the image production device and inside of the image production device that communicates with the image production device;

querying the smart label for serial number information;

receiving the serial number information from the smart label;

determining if the serial number matches a serial number stored in the image production device, wherein if it is determined that the serial number matches the stored serial number performing requested image production device operations, otherwise sending an error signal, wherein the image production device's Media Access Control (MAC) address is stored in the smart label's memory, the method further comprising:

receiving a signal to query a smart label for the image production device's MAC address;

querying the smart label for the image production device's MAC address;

receiving the image production device's MAC address from the smart label;

determining if the image production device's MAC address matches the image production device's MAC address stored in the image production device, wherein if it is determined that the image production device's MAC address matches the stored the image production device's MAC address performing requested image production device operations, otherwise sending an error signal.

10. The method of claim 9, wherein the signal is received from one of a user at the image production device user interface, automatically at a predetermined interval, and at start-up of the image production device.

11. The method of claim 9, wherein the error signal is sent to at least one of the user at the image production device and to a remote facility.

12. The method of claim 9, wherein the image production device is one of a copier, a printer, a facsimile device, and a multi-function device.

13. An image production device, comprising:

a memory that stores serial number information, the serial number information identifying at least one of the image production device and any components of the image production device;

a smart label detection device that receives a signal to query a smart label for serial number information, queries the smart label for serial number information, and receives the serial number information from the smart label, wherein the smart label is a label located at one of on the image production device and inside of the image production device that communicates with the image production device; and a smart label management unit that determines if the serial number matches a serial number stored in the memory, wherein if the smart label management unit determines that the serial number matches the stored serial number, the image production device performs requested operations, otherwise the smart label management unit sends an error signal, wherein the image production device's Media Access Control (MAC) address is stored in the smart label's memory, the smart label detection device receives a signal to query a smart label for the image production device's MAC address, queries the smart label for the image production device's MAC address, receives the image production device's MAC address from the smart label, the smart label management unit determines if the image production device's MAC address matches the image production device's MAC address stored in the image production device, wherein if the smart label management unit determines that the image production device's MAC address matches the stored the image production device's MAC address, the image production device performs requested operations, otherwise the smart label management unit sends an error signal.

14. The image production device of claim 13, wherein the smart label detection unit receives the signal from one of a user at the image production device user interface, automatically at a predetermined interval, and at start-up of the image production device.

15. The image production device of claim 13, wherein the smart label management unit sends the error signal to at least one of the user at the image production device and to a remote facility.

16. The image production device of claim 13, wherein the image production device is one of a copier, a printer, a facsimile device, and a multi-function device.

* * * * *